Figure 1:
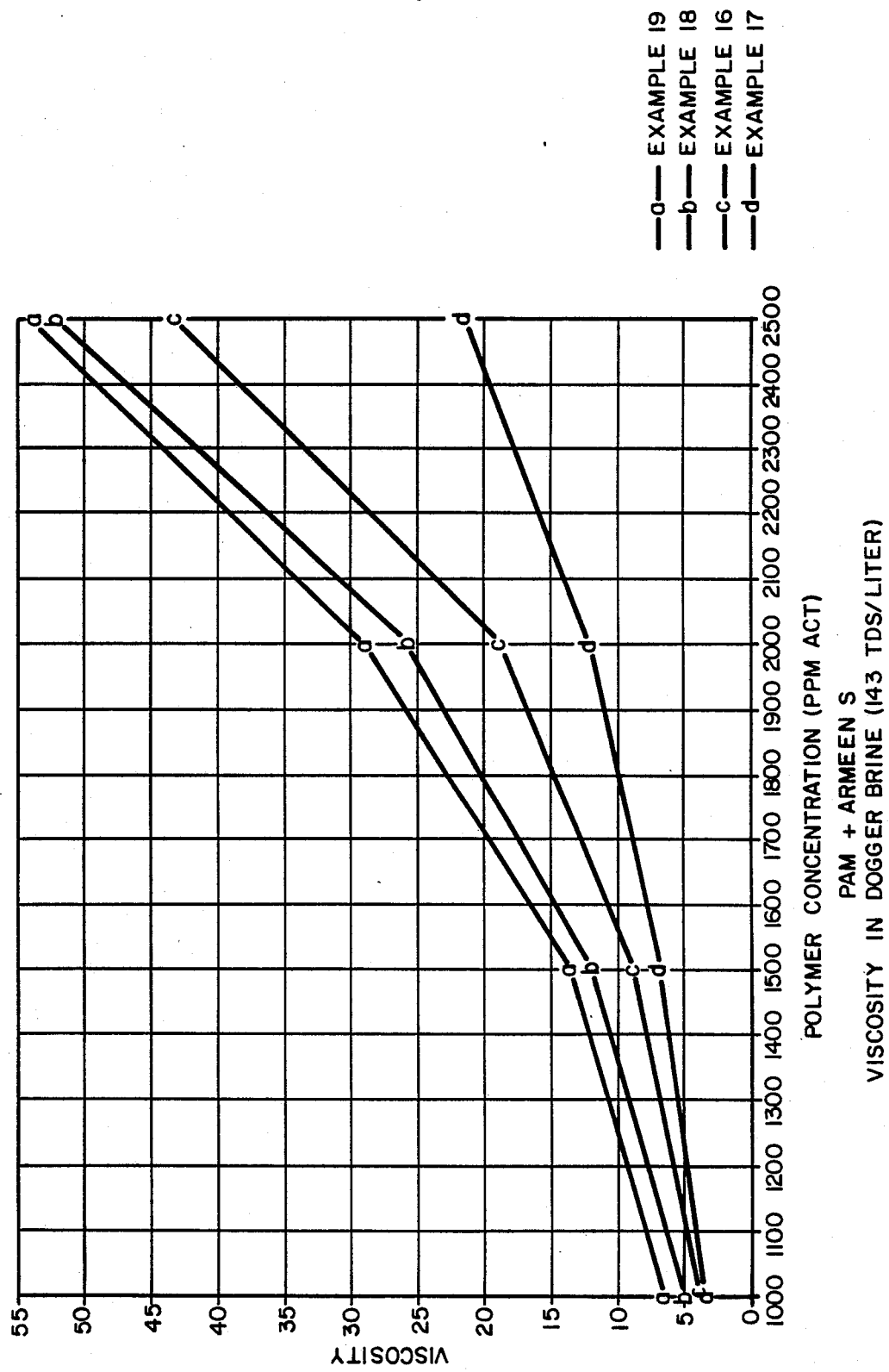

United States Patent [19]

Fong

[11] Patent Number: 4,921,903

[45] Date of Patent: May 1, 1990

[54] PROCESS FOR PREPARING HIGH MOLECULAR WEIGHT HYDROPHOBIC ACRYLAMIDE POLYMERS

[75] Inventor: Dodd W. Fong, Naperville, Ill.

[73] Assignee: Nalco Chemical Company, Naperville, Ill.

[21] Appl. No.: 256,339

[22] Filed: Oct. 11, 1988

[51] Int. Cl.$^5$ ............................................. C08L 39/00
[52] U.S. Cl. ................................... 524/555; 524/801; 526/303.1; 526/304
[58] Field of Search ............................ 524/555, 801; 526/303.1, 304

[56] References Cited

U.S. PATENT DOCUMENTS

| Re. 28,474 | 7/1974 | Anderson et al. |
|---|---|---|
| Re. 28,576 | 10/1975 | Anderson et al. |
| 3,284,393 | 11/1966 | Vanderhoff et al. |
| 3,624,019 | 11/1971 | Anderson et al. |
| 3,663,490 | 5/1972 | Sarem ............................ 524/555 |
| 3,734,873 | 5/1973 | Anderson et al. |
| 3,767,629 | 10/1973 | Vallino et al. |
| 3,826,771 | 7/1974 | Anderson et al. |
| 3,915,920 | 10/1975 | Slovinsky et al. |
| 3,996,180 | 12/1976 | Kane . |
| 3,997,492 | 12/1976 | Kane et al. |
| 4,024,097 | 5/1977 | Slovinsky et al. |
| 4,405,728 | 9/1983 | Krebs et al. ...................... 524/555 |
| 4,524,175 | 6/1985 | Stanley, Jr. ...................... 524/831 |
| 4,663,408 | 5/1987 | Schulz et al. ..................... 526/264 |
| 4,673,716 | 6/1987 | Slano et al. |

Primary Examiner—Joseph L. Schofer
Assistant Examiner—Mark D. Sweet
Attorney, Agent, or Firm—Donald G. Epple; Anthony L. Cupoli

[57] ABSTRACT

A process of making a water-in-oil emulsion which contains from 5-60% by weight of a hydrophobic acrylamide terpolymer composed of the random repeating units:

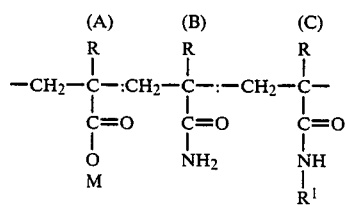

where:
R is methyl or hydrogen,
M is hydrogen, alkali metal, ammonia, or amine,
$R^1$ is a hydrophobic radical, with the mol ratio of A:B:C being A(2-50):B(50-98):C(0.1-15), which comprises reacting a 5-60% by weight water-in-oil emulsion of an acrylamide polymer with a hydrophobic amine at a temperature above 120° C. for a period of time sufficient to transamidate the acrylamide groups in the acrylamide polymer with the hydrophobic amine.

6 Claims, 2 Drawing Sheets

PROCESS FOR PREPARING HIGH MOLECULAR WEIGHT HYDROPHOBIC ACRYLAMIDE POLYMERS

INTRODUCTION

Hydrophobically associating polymers which are copolymers of a water-soluble monomer with a water-insoluble monomer are known to be efficient viscosifiers of aqueous and brine media. These polymers are made by copolymerization in aqueous solution with a large amount of surfactant (see U.S. No. 4,673,716 which is incorporated herein by reference) or in a water-in-oil emulsion with an oil-soluble initiator (see U.S. No. 3,284,393 which is incorporated herein by reference). These methods require the use of hydrophobic monomers which usually are not readily available in commercial quantity. We have found that hydrophobically associative polymers can readily be prepared by modifying water-in-oil emulsions of polyacrylamide latices with an appropriate primary amine. The advantages of this process are that the amines are readily available and the molecular weights of the products can easily be regulated in the backbone preparation.

Another advantage is that when these polymers are in the form of a water-in-oil emulsion they are readily inverted into water to provide a quick dispersion of the polymers without necessitating prolonged stirring or agitation.

THE DRAWINGS

Figure 2:
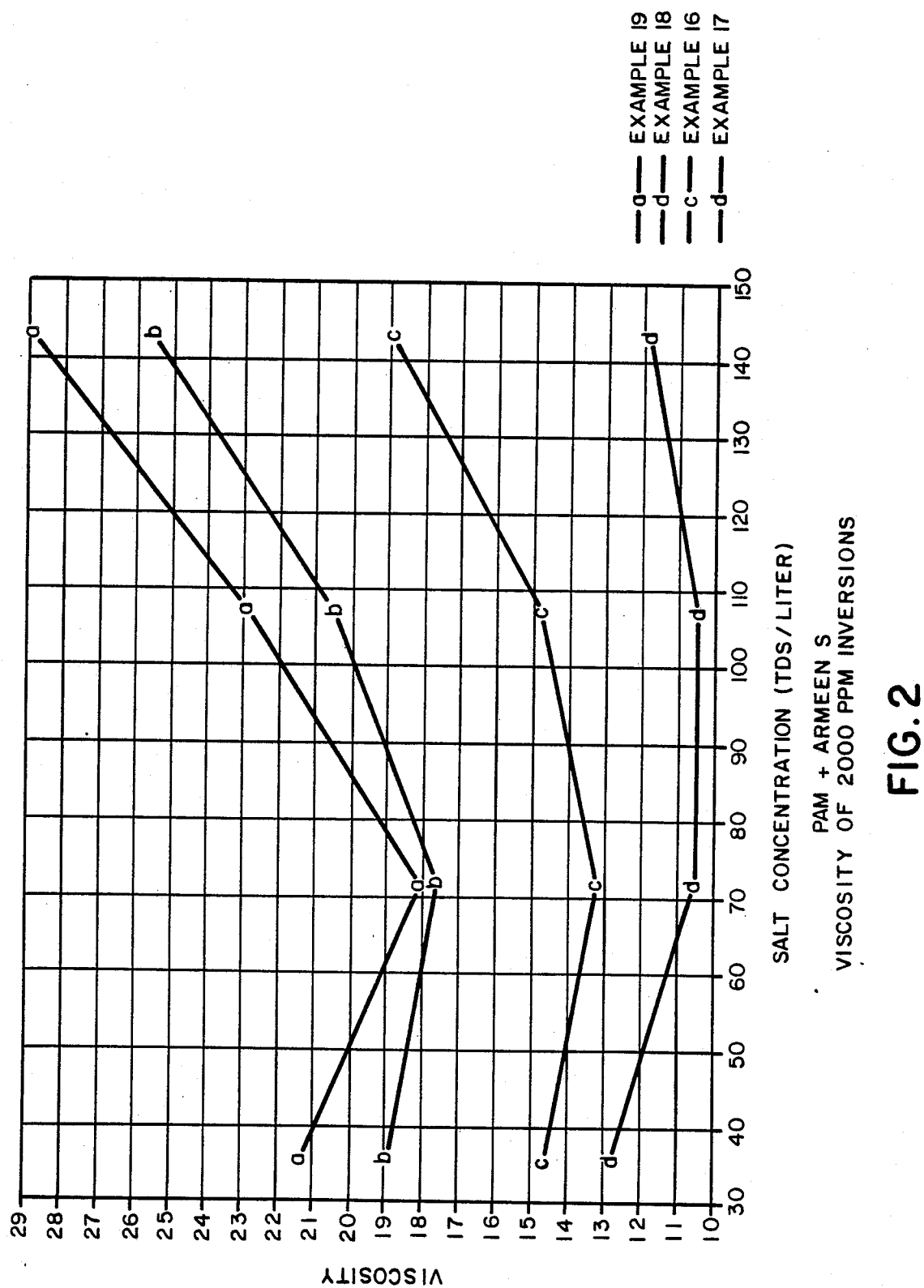

FIG. 1 and FIG. 2 represent solution viscosities of certain mixed fatty hydrophobic[1] acrylamide terpolymers.

[1] Used interchangeably with term "hydrophobically associating"

GENERAL DESCRIPTION OF THE INVENTION

The invention comprises a process of making a water-in-oil emulsion which contains from 5-60% by weight of a hydrophobic acrylamide terpolymer composed of the random repeating units:

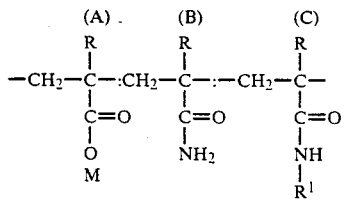

where:
R is methyl or hydrogen,
M is hydrogen, alkali metal, ammonia, or amine,
$R^1$ is a hydrophobic radical,
with the mol ratio of A:B:C being A(2-50):B(50-98):C(0.1-15), which comprises reacting a 5-60% by weight water-in-oil emulsion of an acrylamide polymer with a hydrophobic amine at a temperature above 120° C. for a period of time sufficient to transamidate the acrylamide groups in the acrylamide polymer with the hydrophobic amine.

The Starting Water-in-Oil Emulsions of the Acrylamide Polymers

The starting water-in-oil emulsions of the acrylamide polymers useful in this invention contain four basic components. These components and their weight percentages in the emulsions are listed below:

A. The acrylamide polymer:
  1. Generally from 5-60%;
  2. Preferably from 20-50%; and
  3. Most preferably from 35-45%;
B. Water:
  1. Generally from 20-90%;
  2. Preferably from 20-70%; and
  3. Most preferably from 30-55%;
C. Hydrophobic liquid:
  1. Generally from 5-75%;
  2. Preferably from 5-40%; and
  3. Most preferably from 20-30%; and
D. Water-in-oil emulsifying agent:
  1. Generally from 0.1-20%;
  2. Preferably from 1-15%;
  3. Most preferably from 1.2-10%.

It is also possible to further characterize the water-in-oil emulsions of acrylamide polymers with respect to the aqueous phase of the emulsions. This aqueous phase is generally defined as the sum of the acrylamide polymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25-95% by weight of the emulsion. Preferably, the aqueous phase is between 60-90% and most preferably from 65-85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5-14, and most preferably from 1.0-2.75.

The Water-Soluble Acrylamide Polymers

The acrylamide polymers contained in the emulsions should have a minimum molecular weight of 50,000. A preferred molecular weight for the starting polymers is at least 500,000, and most preferably one million or greater. In most applications where the hydrophobic acrylamide terpolymers are used as hydrophobically associative polymers, the molecular weights will be between 1-20 million.

While the emulsions above described are referred to as water-in-oil emulsions of acrylamide polymers, such emulsions as the term is used herein includes copolymers of acrylamide which contain up to as much as 2-50 mol ratios of acrylic acid. In the transamidation procedure described hereafter, certain amounts of acrylic acid are produced due to hydrolytic effects.

If substantial quantities of acrylic acid are desired in the finished hydrophobic acrylamide terpolymers, then hydrolysis of the latex using appropriate amounts of acid or base during the transamidation step hereafter described.

The Hydrophobic Liquids

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain isoparaffinic solvent sold by Humble Oil and Refinery Company under the tradename "Isopar M" described in U.S. No. 3,624,019 and a paraffinic solvent sold by the Exxon Company, U.S.A. called "Low Odor Paraffinic Solvent". Typical specifications of this material are set forth below in Table I.

TABLE I

| Specific Gravity 60°/60° F. | 0.780–0.806 |
|---|---|
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

The Water-In-Oil Emulsifying Agents

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

A most preferred emulsifier system uses a surfactant or mixture of surfactants, preferably including a polysoap surfactant, which may be exemplified by Rapisol B-246, P-18. Rapisol B-246 is an ABA block copolymer where A=12-hydroxystearate (MW at 1,500) and B=polyethylene oxide (MW at 1,500) with a hydrophylic-hydrophobic balance (HLB) of 5–6. P-18 is a 1:1 copolymer of 1-octadecene and maleic anhydride with a molecular weight of about 50,000 and sold by Gulf Chemical Company.

The Preparation of the Water-In-Oil Emulsions of the Starting Acrylamide Polymers The general method for the preparation of emulsions of the type described above is contained in Vanderhoff, U.S. No. 3,284,393. A typical procedure for preparing water-in-oil emulsions of this type includes preparing an aqueous solution of acrylamide, and in certain cases solutions of acrylamide and acrylic acid, and adding this solution to one of the hydrocarbon oils described above. With the addition of a suitable water-in-oil emulsifying agent and under agitation, the emulsion is then subjected to free radical polymerization conditions and a water-in-oil emulsion of the acrylamide polymer is obtained. It should be pointed out that the ingredients are chosen based upon the weight percentages given above and their compatibility with each other. As to choice of free radical catalyst, these materials may be either oil or water-soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. No. 3,624,019, RE 28,474, U.S. No. 3,734,873, RE 28,576, U.S. No. 3,826,771, all of which are incorporated by reference, the use of air may be employed to control polymerization. This technique is described in U.S. No. 3,767,629 which is also hereinafter incorporated by reference.

In addition to the above references, U.S. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. No. 3,915,920, discloses stabilizing water-in-oil emulsions of the type above described utilizing various oil-soluble polymers such as polyisobutylene. Employment of techniques of this type provides for superior stabilizes emulsions.

Of still further interest is U.S. No. 3,997,492 which describes the formation of water-in-oil emulsions of the type above described.

Physical Properties of the Starting Water-In-Oil Emulsions

The starting water-in-oil emulsions of the finely divided acrylamide polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 3,000 cps. It will be seen, however, that the viscosity of these emulsions can be affected greatly by increasing or decreasing the polymer content, oil content, or water content as well as the choice of a suitable water-in-oil emulsifier.

Another factor attributing to the viscosity of these types of emulsions is the particle size of the polymer which is dispersed in the discontinuous aqueous phase. Generally, the smaller the particle obtained, the less viscous the emulsion. At any rate, it will be readily apparent to those skilled in the art as to how the viscosity of these types of materials can be altered.

The Starting Hydrophobic Amines

The amines used to produce the hydrophobic acrylamide terpolymers may be selected from a wide variety of primary amines. Usually these amines will contain at least 3 carbon atoms and most preferably will contain at least 12 carbon atoms.

They may be aliphatic, cyclo-aliphatic, arylalkyl or alkaryl amines.

While the amines in a preferred embodiment of the invention are aliphatic and are primarily hydrocarbon substituted amines, they may contain minor amounts of hydrophobic elements within their structure, e.g. oxygen.

For purposes of illustrative amines of the above type, the following amines are considered to be illustrative:
Propylamine
Cyclohexylamine
N-octylamine
Phenethylamine
Oleylamine
Armeen S
Octadecylamine
Hydroxystearyl amine The above list includes the amine, Armeen S. This is a mixed fatty amine with the hydrocarbon portion being derived from soya radicals which are obtained from soybean oils. Other mixed amines may be used such as tallow and coconut amines.

Method of Preparation of the Hydrophobic Acrylamide Terpolymers

In the present process a water-in-oil emulsion of polyacrylamide or its acrylic acid copolymer is mixed with hydrophobic amine. The hydrophobic amine is used in amounts previously specified to produce the desired end product. The reaction mixture in a preferred embodiment also contains added low odor paraffinic solvent (LOPS) and added surfactants such as Span 80 (Soribtan monostearate), or preferably a polysoap surfactant such as P-18.

The water-in-oil emulsion of the polyacrylamide used in a starting material is a stabilized water-in-oil emulsion in which the oil or solvent phase is a paraffinic solvent such as LOPS (low odor paraffinic solvent). THe starting polyacrylamide emulsions preferably used as starting materials may have RSV's from 5 and above and preferably from 18 to 50.

The transamidation process of the invention is carried out at a temperature of at least 120° C. up to about 180° C. for a time period of about 30 minutes to 6 hours or more. Preferred temperatures ranges are from about 130° C. to 160° C. A preferred reaction time ranges from 1 to 6 hours. The transamidation can be carried out in the presence of varying amounts of NaOH or HCl which, as indicated, controls the amount of carboxylate formation.

EXAMPLES

Using the above preparative techniques, a variety of hydrophobic acrylamide terpolymers were prepared. These preparations are set forth below in Table II.

TABLE II

Hydrophobically Modified Polyacrylamide Latexes

| Example No. | Amine Used | Amount Charge, Mole % (Wt. %) | RSV | IV | $-CO_2-$ | 2° Amide Formed | Comment |
| --- | --- | --- | --- | --- | --- | --- | --- |
| 1 | Propylamine | 10 | 19.2 | — | 29 | — | — |
| 2 | Propylamine | 10 | 31.1 | 16.2 | 31 | 6.4 | — |
| 3 | Propylamine | 10 | 54.7 | 33.3 | 43 | 7.1 | — |
| 4 | Cyclohexylamine | 10 | 40.4 | 25.1 | 21 | 3.2 | — |
| 5 | Cyclohexylamine | 10 | 57.6 | 34.3 | 49 | 3.6 | — |
| 6 | Cyclohexylamine | 0.255 | 16.0 | 10.1 | 35 | 0.122 | — |
| 7 | Cyclohexylamine | 0.512 | 17.9 | 10.6 | 36 | 0.244 | — |
| 8 | Cyclohexylamine | 0.768 | 16.9 | 10.4 | 34 | 0.366 | — |
| 9 | n-octylamine | (5) | — | — | — | — | latex gelled |
| 10 | phenethylamine | (3) | 12.6 | 7.4 | 38 | — | — |
| 11 | phenethylamine | (5) | 29.0 | 17.3 | 39 | — | moderate gel |
| 12 | phenethylamine | (5) | 24.4 | 13.7 | 28 | — | amine neutralized |
| 13 | phenethylamine | (10) | — | — | — | — | latex gelled |
| 14 | oleylamine | (5) | 5.9 | 4.2 | 37 | — | — |
| 15 | oleylamine | (10) | 3.8 | 2.7 | 34 | — | — |
| 16 | Armeen S | (5) | 17.4 | 12.3 | 34 | — | — |
| 17 | Armeen S | (10) | 12.2 | 9.7 | 32 | — | — |
| 18 | Armeen S | (4) | 25.6 | 16.5 | 35 | — | — |
| 19 | Armeen S | (3) | 27.9 | 17.5 | 34 | — | — |
| 20 | Armeen S | (1) | 13.1 | 8.0 | 37 | — | — |
| 21 | Armeen S | (2) | 13.7 | 9.4 | 32 | — | — |
| 22 | octadecylamine | (5) | 10.5 | 8.1 | 37 | — | — |

TABLE II-continued

| | Hydrophobically Modified Polyacrylamide Latexes | | | | | | |
|---|---|---|---|---|---|---|---|
| Example No. | Amine Used | Amount Charge, Mole % (Wt. %) | RSV | IV | $-CO_2-$ | 2° Amide Formed | Comment |
| 23 | octadecylamine | (10) | 5.0 | 4.7 | 32 | — | — |

Notes:
(1) Residual amine was determined by G.C.
(2) RSV (0.045% polymer in 1 molar $NaNO_3$ at 30° C.) for the polyacrylamide backbone was 21
(3) RSV (0.045% polymer in 1 molar $NaNO_3$ at 30° C.) for the polyacrylamide backbone was 15.8
(4) RSV (0.045% polymer in 1 molar $NaNO_3$ at 30° C.) for the polyacrylamide backbone was 20

The solution viscosities of some hydrophobic acrylamide terpolymers as described in FIGS. 1 and 2.

The Inversion of the Water-in-Oil Hydrophobic Acrylamide Emulsions

The water-in-oil emulsions of the hydrophobic acrylamide terpolymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. No. 3,624,019, hereinafter incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50 percent based on the polymer. Good inversion often occurs within the range of 1.0-10 percent based on polymer.

The preferred surfactants utilized to cause the inversion of the water-in-oil emulsion of this invention when the emulsion is added to water are hydrophilic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc, can be used. Preferred surfactants are generally nonyl phenols which have been ethoxylated with between 8-15 moles of ethylene oxide. A more complete list of surfactants used to invert the emulsion are found in Anderson, U.S. No. 3,624,019 at columns 4 and 5.

Having thus described my invention, I claim:

1. A process of making a water-in-oil emulsion which contains from 5-60% by weight of a hydrophobic acrylamide terpolymer composed of the random repeating units:

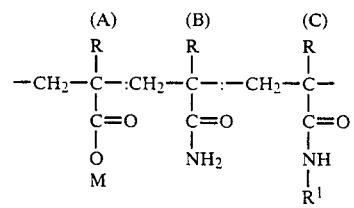

where:
R is methyl or hydrogen,
M is hydrogen, alkali metal, ammonia, or amine,
$R^1$ is a hydrophobic radical,
with the mol ratio of A:B:C being A(2-50):B(50-98):C(0.1-15), which comprises reacting a 5-60% by weight water-in-oil emulsion of an acrylamide polymer with a hydrophobic amine at a temperature above 120° C. for a period of time sufficient to transamidate the acrylamide groups in the acrylamide polymer with the hydrophobic amine.

2. The process of claim 1 wherein the ratio of A:B:C is: A(2-35):B(55-98):C(0.1-10).

3. The process of claim 1 where $R^1$ is a hydrocarbon radical containing at least 3 carbon atoms.

4. The process of claim 2 where $R^1$ is a hydrocarbon radical of at least 3 carbon atoms.

5. The process of claim 3 where $R^1$ contains at least 12 carbon atoms.

6. The process of claim 4 where $R^1$ is a hydrocarbon radical containing at least 12 carbon atoms.

* * * * *